Jan. 30, 1934.    N. A. CHRISTENSEN    1,944,921
VEHICLE BRAKE MECHANISM
Filed July 11, 1928    2 Sheets-Sheet 2
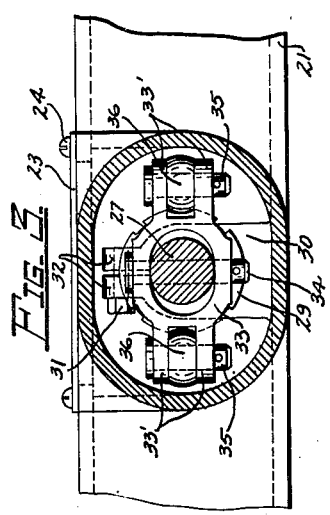
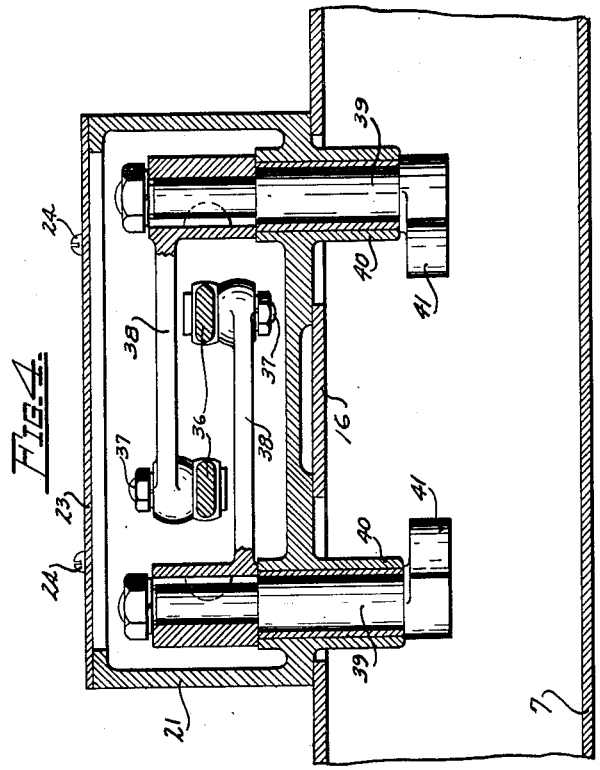
INVENTOR.
Niels A. Christensen
BY
Quarles & French
ATTORNEYS Patented Jan. 30, 1934

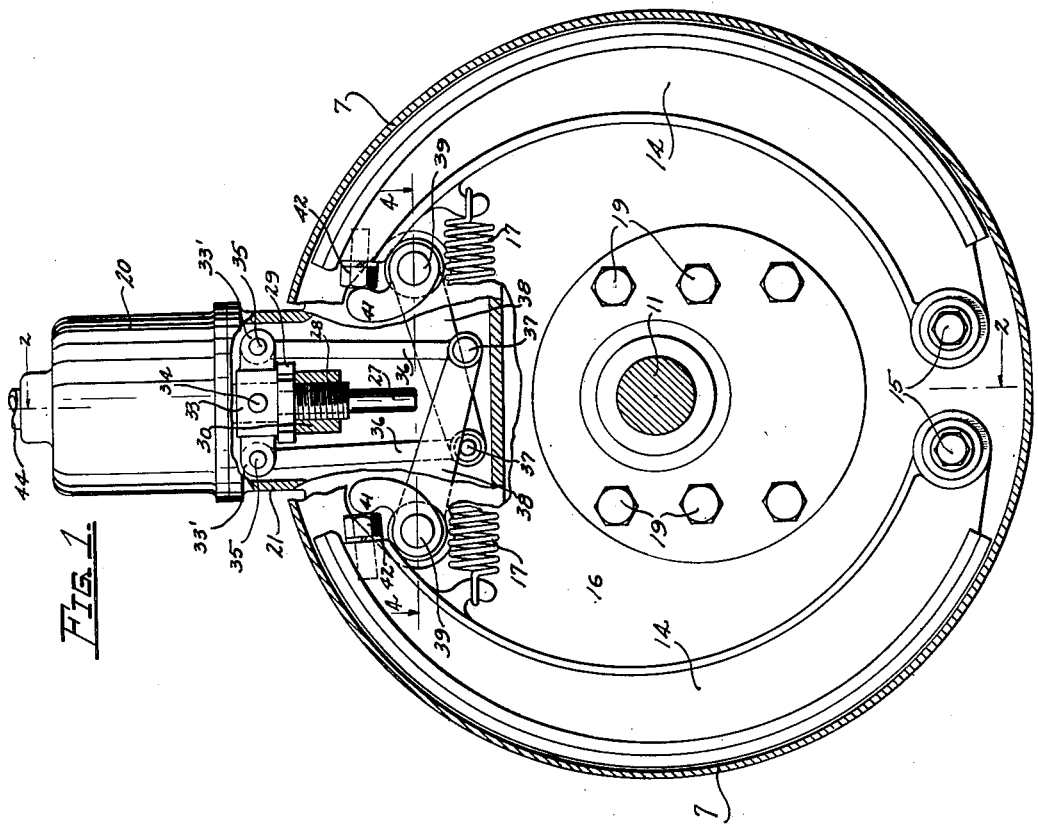
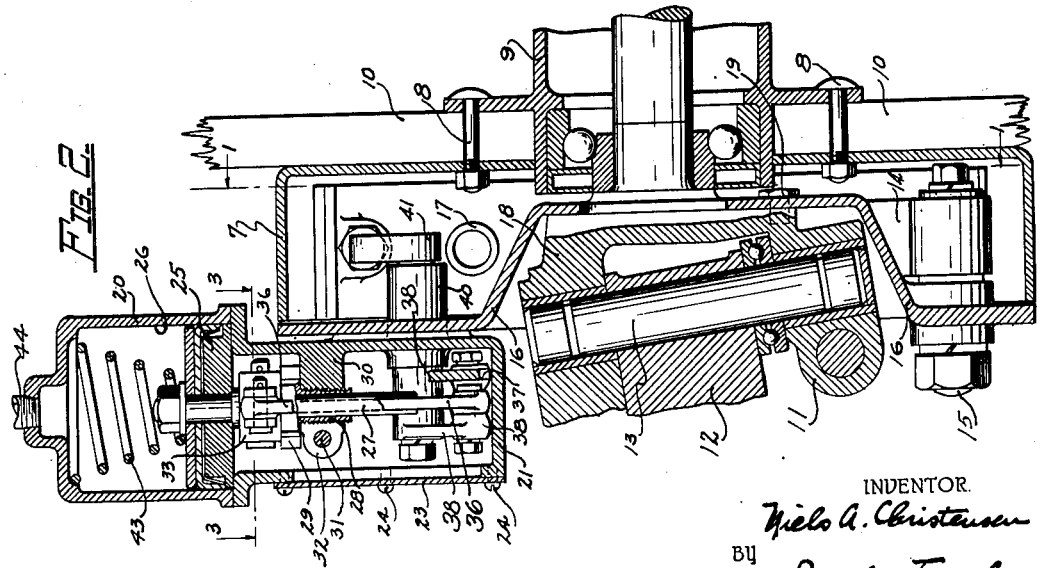

1,944,921

UNITED STATES PATENT OFFICE 1,944,921

VEHICLE BRAKE MECHANISM

Niels A. Christensen, Cleveland, Ohio

Application July 11, 1928. Serial No. 291,835

5 Claims. (Cl. 188—152)

The invention relates to vehicle brake mechanism.

Where automotive vehicles have been equipped with brakes operated by suction pressure induced in the manifold of the engine, it has been customary to provide a brake cylinder mounted on the chassis of the vehicle and connect this cylinder up to brakes by brake rodding. While such prior constructions introduce no especial difficulties in the proper operation and functioning of the brakes associated with the rear wheels, they do involve the use of universal joints and other complications for applying the brakes to the front wheels and, so far as I am aware, this inherent defect of the vacuum brake systems has been accepted as a necessary evil. While the use of a brake cylinder or brake cylinders associated with the front or rear wheel brake and having a piston or pistons operated either by compressed air or by oil under pressure has been known for some time, these constructions have never been designed or were never intended to be operated or adapted to be operated by the suction pressure of the engine as the power fluid. The main object of the present invention is to provide a brake mechanism associated with either the front or rear wheels of an automotive vehicle wherein the piston or pressure-responsive member is mounted on or directly associated with the wheel support and is operatively connected to the parts forming the brake to apply the same, said piston being operated by suction pressure, thereby doing away with the brake rodding usually employed.

A further object of the invention is to provide a novel form of brake-operating mechanism.

The invention further consists in the several features hereinafter set forth and more particularly defined by claims at the conclusion hereof.

In the drawings Fig. 1 is a vertical sectional view through a vehicle brake embodying the invention, taken along the line 1—1 of Fig. 2, parts being also broken away and parts being shown in section;

Fig. 2 is a vertical sectional view through a vehicle brake embodying the invention, taken along the line 2—2 of Fig. 1;

Fig. 3 is a detail sectional view taken on the line 3—3 of Fig. 2;

Fig. 4 is a detail sectional view taken on the line 4—4 of Fig. 1, the brake members being omitted;

Fig. 5 is a detail side elevation view of the brake cylinder.

Referring to the drawings, the numeral 7 designates a brake drum adapted to be connected with either the front or rear wheel of an automotive vehicle and here shown as secured by bolts 8 to the hub 9 and spokes 10 of the front wheel of an automotive vehicle, said hub 9 being suitably mounted on the steering knuckle 11 which in turn is pivotally mounted on and operatively connected to the front axle 12 by a pivot pin 13, said knuckle being connected with the steering gear of the vehicle in any suitable manner.

The brake may be of any suitable construction and by way of illustration I have shown a brake comprising a pair of oppositely disposed shoes 14, each pivotally connected at one end by an anchor pin 15 to a brake support 16 and adapted to be held in release position by a spring 17 connected at its ends respectively with the free ends of said shoes. The brake, of course, may take other forms, such as a band, as shown in my prior Patent No. 1,620,073, dated March 8, 1927, and either the shoes or the band may have various forms of anchorage, the general arrangement in each case providing for the movement of the free ends of the shoes or the band into braking engagement with the drum 7.

The brake support 16 is, in the case of a front wheel brake mechanism, secured to a boss 18 formed as a part of the steering knuckle, by bolts 19 and is preferably in the form of a disk covering the open end of the brake drum 7.

The brake-actuating mechanism embodying the invention includes a brake cylinder 20 mounted upon a base 21 in the form of a casing secured by bolts 22 to the upper portion of the brake support 16, said casing having an open end closed off by a removable cover plate 23 secured to said casing by screws 24.

A pressure-responsive member is associated with the brake cylinder 20 and is here shown as a suitably packed piston 25 working in the bore 26 of said cylinder. This pressure-responsive member is provided with an actuating extension, here shown as a rod 27 secured to the piston and guided by and slidably mounted in the bore of a threaded sleeve extension 28 of an adjustable stop member 29. This threaded sleeve has threaded engagement with a lug 30 projecting inwardly from the base 21, said lug being slotted to provide a split-nut construction which is securely locked to the threaded shank or extension 28 by a bolt 31 passing through the spaced ears 32.

A cross head 33 is apertured to receive the rod 27 and is secured thereto by a pivot pin 34 passing through opposite sides of said cross head and through a hole in said rod. This cross head has bifurcations at each end forming spaced ears 33' or lugs receiving pins 35. Each pin 35 extends through the upper eyed end of a link 36. The lower end of each link is pivotally connected by a pin 37 to a lever arm 38 which is keyed or otherwise suitably connected to a shaft 39 journalled in a boss 40 formed in the base 21, said shaft having a brake-engaging lever arm 41 formed integral therewith and engageable with a screw 42 mounted in the end of the brake member.

The brake-actuating mechanism above described is normally urged to release position by a spring 43 interposed between the head end of the brake cylinder and the front end of the piston and a pipe 44 connects the head end of the cylinder with any suitable valve mechanism for controlling the power fluid, which in the case of a vacuum brake connects the brake cylinder either with the suction source, such as the intake manifold of the engine, to cause the piston 25 to move upwardly in the cylinder or with the atmosphere to permit the piston to move to release position.

With this construction, when the interior of the brake cylinder is connected to the vacuum source the piston 25 is drawn up into the brake cylinder against the pressure of the relatively light spring 43 and on its upward movement moves the cross head 33 upwardly, thereby pulling the links 36 upwardly and causing the inner ends of the levers, formed by the parts 38, 40 and 41, to swing upwardly and hence move the outer ends or arms 41 outwardly against the shoes 14 and thus move them into braking engagement with the drum 7. As the cross head is free to pivot on the rod the thrust from the links 36 is equalized. The levers 38, 40 and 41 are preferably multiplying levers.

When the suction pressure is cut off by the operation of the control valve and the pipe 44 connected with atmosphere, the spring 17 moves the brake members to release position and the spring 43 assists in moving the piston 25 and the links 36 and levers connected therewith to release position. The release position is determined by the position of the stop member 29, whose head is provided with notches 45 for receiving a suitable spanner wrench so that the cross head 33 will engage said head sooner or later and thus determine the release position of said cross head and hence the release position of the actuating levers and the brakes which are held by the spring 17 against these levers.

I desire it to be understood that this invention is not to be limited to any particular form or arrangement of parts except insofar as such limitations are included in the claims.

What I claim as my invention is:

1. In brake mechanism for automotive vehicles, the combination with a brake including a brake drum and brake parts movable into braking engagement with the drum, of a brake cylinder, a pressure-responsive member associated with said cylinder and provided with an actuating member, a cross head connected to said member, a pair of levers for moving said brake parts into engagement with said drum, means connecting said levers to opposite sides of said cross head, and an adjustable stop to limit the release position of said cross head.

2. In brake mechanism for automotive vehicles, the combination with a brake including a brake drum and oppositely disposed pivotally mounted brake shoes engageable with said drum, of a support, a brake cylinder on said support, a pressure responsive member associated with said cylinder and provided with an actuating member, a cross head connected to said actuating member, a stop member adjustably mounted on said support and engageable with said cross head in the release position of said shoes, a pair of multiplying levers in crossed relation engageable with the free end portions of said shoes, means for connecting said levers to said cross head, and spring means acting on said shoes and levers to move them to release position.

3. In a brake mechanism for automotive vehicles, the combination with a brake including a brake drum and oppositely disposed pivotally mounted brake shoes engageable with said drum, of a support, a brake cylinder on said support, a pressure responsive member associated with said cylinder and provided with an actuating member, a pair of multiplying levers, having their longer arms in crossed relation and extending respectively beyond the axis of said actuating member and the other arms of said levers being engageable with the free end portions of said shoes, links for connecting the ends of the longer arms of said levers to said actuating member, and means to move said shoes and levers to release position.

4. In a brake mechanism for automotive vehicles, the combination with a brake including a brake drum and brake shoes engageable with said drum, of a support for said shoes, a housing mounted on said support, a brake cylinder on said housing, a pressure responsive member associated with said cylinder and provided with an actuating member within said housing, multiplying levers having their longer arms in crossed relation and extending respectively beyond the axis of said actuating member, said arms being mounted in said housing and being operatively connected to said actuating member at their ends, the other arms of said levers being operatively connected with said shoes, and means to move said shoes and levers to release position.

5. In a brake mechanism for automotive vehicles, the combination with a brake including a brake drum and oppositely disposed pivotally mounted brake shoes engageable with said drum, of a support for said shoes, a housing mounted on said support and having bearings projecting through said support and into said drum, a brake cylinder on said housing, a pressure responsive member associated with said cylinder and provided with an actuating member, a cross head connected to said actuating member, a pair of multiplying levers having one of their arms operatively connected to said cross head, their fulcrums journalled in said bearings in said housing and their other arms engageable with said shoes, and means acting on said shoes and levers to move them to release position.

NIELS A. CHRISTENSEN.